US012639071B2

(12) United States Patent
Koidala et al.

(10) Patent No.: US 12,639,071 B2
(45) Date of Patent: May 26, 2026

(54) DATA PACKING FOR POWER AND AREA-EFFICIENT MEMORY STRUCTURES AND PERFORMANCE-EFFICIENT DECODING OF ENCODED DATA

(71) Applicant: Xilinx, Inc., San Jose, CA (US)

(72) Inventors: Durga Neeraj Koidala, Hyderabad (IN); Robert Bellarmin Susai, Hyderabad (IN); Vishnu Cheerakoda, Hyderabad (IN); Rohit Kumar Sharma, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 184 days.

(21) Appl. No.: 18/616,932

(22) Filed: Mar. 26, 2024

(65) Prior Publication Data

US 2025/0306936 A1     Oct. 2, 2025

(51) Int. Cl.
*G06F 9/30*        (2018.01)
*G06F 9/355*       (2018.01)
*G06F 13/16*       (2006.01)

(52) U.S. Cl.
CPC .......... *G06F 9/30145* (2013.01); *G06F 9/355* (2013.01); *G06F 13/1673* (2013.01)

(58) Field of Classification Search
CPC ... G06F 9/30145; G06F 9/355; G06F 13/1673
See application file for complete search history.

(56) References Cited

U.S. PATENT DOCUMENTS

| | | | |
|---|---|---|---|
| 6,879,266 B1 * | 4/2005 | Dye ........................ | H03M 7/40 |
| | | | 711/170 |
| 2016/0103680 A1 * | 4/2016 | Tanaka .................. | G06F 9/3887 |
| | | | 712/221 |
| 2017/0285976 A1 * | 10/2017 | Durham .................. | G06F 21/64 |
| 2021/0152183 A1 * | 5/2021 | Lu ........................ | H03M 7/6023 |
| 2022/0239316 A1 * | 7/2022 | Yamagiwa .......... | H03M 7/6052 |

OTHER PUBLICATIONS

Deutsch, P., "RFC1951: Deflate Compressed Data Format Specification, v. 1.3," Aladdin Enterprises, May 1996, 15 pg.
"LZ77 and LZ78," [online] Wikipedia, The Free Encyclopedia, [updated Apr. 9, 2024], retrieved from the Internet: <https://en.wikipedia.org/wiki/LZ77_and_LZ78>, 6 Pg.

* cited by examiner

*Primary Examiner* — Zachary K Huson
(74) *Attorney, Agent, or Firm* — Kevin T. Cuenot

(57)        ABSTRACT

A system for packing data includes a controller configured to receive compressed data. The compressed data includes data items and qualifier bits for the data items. The controller is configured to discard the data items designated as invalid by the qualifier bits. The controller is configured to generate data type bits specifying data type information for the data items designated as valid by the qualifier bits. The system includes a buffer. The controller is configured to store the data items designated as valid by the qualifier bits and the data type bits in the buffer. A system can include one or more decoders configured to decode encoded data and output literals, lengths, and distances.

20 Claims, 9 Drawing Sheets

| | Literal | Match Length | Distance | Literal Valid | ML-Distance Pair Valid |
|---|---|---|---|---|---|
| 1 | a | - | - | 1 | 0 |
| 2 | b | - | - | 1 | 0 |
| 3 | c | - | - | 1 | 0 |
| 4 | d | - | - | 1 | 0 |
| 5 | e | - | - | 1 | 0 |
| 6 | - | 3 | 4 | 0 | 1 |
| 7 | f | 5 | 7 | 1 | 1 |

□
□
□
□

200

230

| | Literal 0 | Literal 1 | Literal 2 | Match Length | Distance | Literal 0 Qualifier Bit | Literal 1 Qualifier Bit | Literal 2 Qualifier Bit | ML-Distance Qualifier Bit |
|---|---|---|---|---|---|---|---|---|---|
| 1 | a | b | c | - | - | 1 | 1 | 1 | 0 |
| 2 | d | e | - | 3 | 4 | 1 | 1 | 0 | 1 |
| 3 | f | - | - | 5 | 7 | 1 | 0 | 0 | 1 |

| f | 4 | 3 | e | d | c | b | a |
|---|---|---|---|---|---|---|---|
|   |   |   |   |   |   | 7 | 5 |

□
□
□

Data Buffer 212

| 1 | 1 | 1 | 1 |
|---|---|---|---|
| 0 | 1 | 0 | 1 |

□
□
□

Data Type Buffer 214

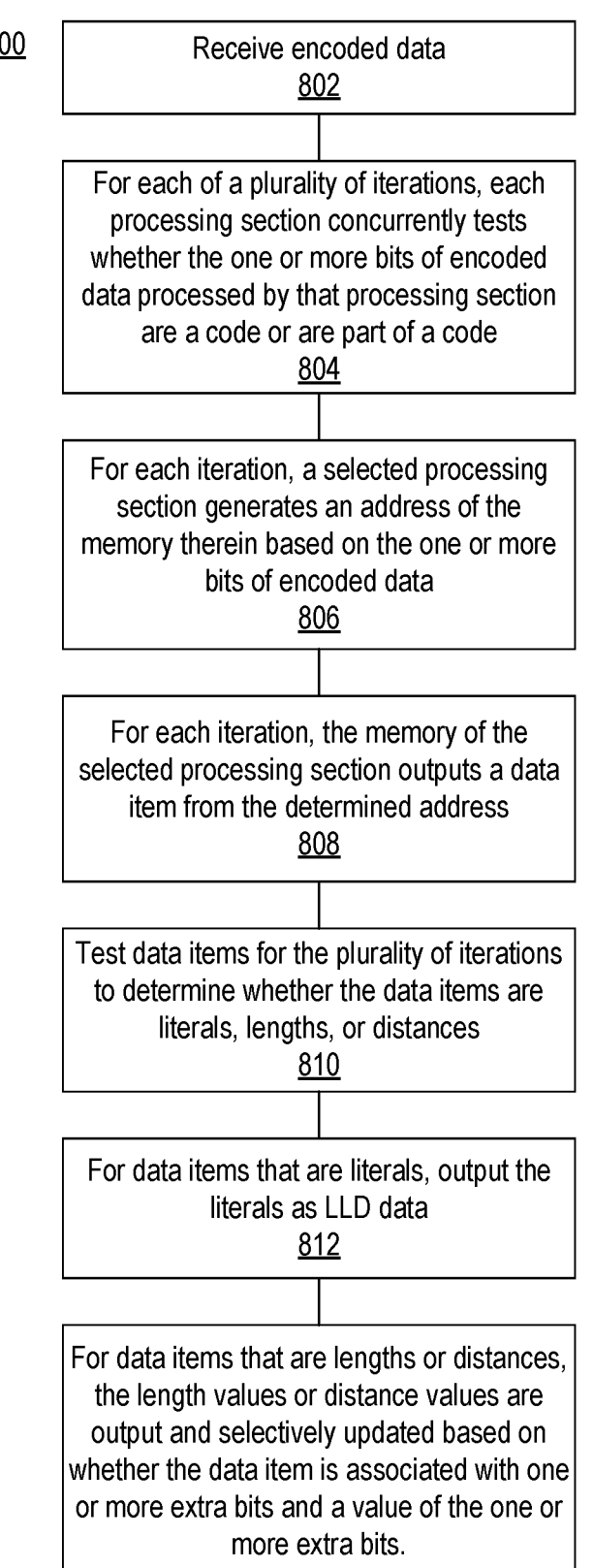

Receive encoded data
802

For each of a plurality of iterations, each processing section concurrently tests whether the one or more bits of encoded data processed by that processing section are a code or are part of a code
804

For each iteration, a selected processing section generates an address of the memory therein based on the one or more bits of encoded data
806

For each iteration, the memory of the selected processing section outputs a data item from the determined address
808

Test data items for the plurality of iterations to determine whether the data items are literals, lengths, or distances
810

For data items that are literals, output the literals as LLD data
812

For data items that are lengths or distances, the length values or distance values are output and selectively updated based on whether the data item is associated with one or more extra bits and a value of the one or more extra bits.
814

FIG. 8

DATA PACKING FOR POWER AND AREA-EFFICIENT MEMORY STRUCTURES AND PERFORMANCE-EFFICIENT DECODING OF ENCODED DATA

TECHNICAL FIELD

This disclosure relates to integrated circuits (ICs) and, more particularly, to data packing for power and area efficient memory structures and performance-efficient decoding of encoded data.

BACKGROUND

Data packing generally refers to operations performed by electronic circuitry to export or store data with a particular or predetermined organization. Data may be packed in order to convey the data from a first system to a second, downstream system. As an illustrative and non-limiting example, data output from the first system may require further processing by a second and different system. In this example, data that is output from the first system may be buffered in a memory from which the second system accesses that data for further processing.

To facilitate efficient transfer of the data from the first system to the second system, the data may be stored in the memory with a particular or predetermined organization or "packing." The manner in which the data is packed in the memory may have a significant impact on various aspects of the electronic system. For example, the data packing may influence the processing speed of the electronic system, the size of memory or memories (e.g., memory structure(s)) required to store the data as packed, among other attributes. As may be appreciated, the size of the memory structure(s) required may influence the cost and size of the overall electronic system, which may include or be implemented as an integrated circuit.

SUMMARY

One or more embodiments relate to a system. The system includes a controller configured to receive compressed data. The compressed data includes data items and qualifier bits for the data items. The controller is configured to discard data items designated as invalid by the qualifier bits. The controller is configured to generate data type bits specifying data type information for data items designated as valid by the qualifier bits. The system includes a buffer. The controller is configured to store the data items designated as valid by the qualifier bits and the data type bits in the buffer.

The foregoing and other implementations can each optionally include one or more of the following features, alone or in combination. Some example implementations include all the following features in combination.

In an aspect, the data items include a plurality of literals and a plurality of match-length-distance pairs. The controller is configured to store each valid literal and each valid match-length-distance pair within the buffer.

In another aspect, the data items designated as valid are stored in consecutive memory locations of the buffer.

In another aspect, the compressed data is received as one or more data blocks. Each data block includes a plurality of literal slots, one match-length-distance slot, and a plurality of qualifier bits.

In another aspect, the controller is configured to receive one data block each clock cycle.

In another aspect, each qualifier bit specifies whether a corresponding literal slot or a corresponding match-length-distance slot stores a valid data item.

In another aspect, the buffer includes a data buffer and a data type buffer. The data buffer is configured to store the data items designated as valid. The data type buffer is configured to store the data type bits.

In another aspect, the data items designated as valid are stored in consecutive memory locations of the data buffer. The data type bits are stored in consecutive memory locations of the data type buffer.

In another aspect, the data buffer has a width wide enough to store data items designated as valid from at least an entire data block of the one or more data blocks.

In another aspect, the controller, in response to accumulating the data items designated as valid in an amount sufficient to fill a row of the data buffer, writes the amount of the data items designated as valid to the row of the data buffer.

In another aspect, the controller, in response to accumulating the data type bits in an amount sufficient to fill a row of the data type buffer, writes the amount of the data type bits to the row of the data type buffer.

In another aspect, the system includes an encoder. The encoder may be configured to encode the data items designated as valid as read from the buffer based on the data type bits read from the buffer.

One or more embodiments relate to a method. The method includes receiving, by a controller, compressed data. The compressed data includes data items and qualifier bits for the data items. The method includes discarding, by the controller, the data items designated as invalid by the qualifier bits. The method includes generating, by the controller, data type bits specifying data type information for the data items designated as valid by the qualifier bits. The method includes storing the data items of the compressed data designated by the qualifier bits as valid and the data type bits within a buffer.

The foregoing and other implementations can each optionally include one or more of the following features, alone or in combination. Some example implementations include all the following features in combination.

In an aspect, the data items include a plurality of literals and a plurality of match-length-distance pairs. In that case, storing the data items includes storing each valid literal and each valid match-length-distance pair within the buffer.

In another aspect, data items designated as valid are stored in consecutive memory locations of the buffer.

In another aspect, the compressed data is received as one or more data blocks. Each data block includes a plurality of literal slots, one match-length-distance slot, and a plurality of qualifier bits.

In another aspect, the method includes receiving the compressed data by receiving one data block each clock cycle.

In another aspect, each qualifier bit specifies whether a corresponding literal slot or a corresponding match-length-distance slot stores a valid data item.

In another aspect, the buffer includes a data buffer and a data type buffer. The data buffer is configured to store the data items designated as valid. The data type buffer is configured to store the data type bits.

In another aspect, the data items designated as valid are stored in consecutive memory locations of the data buffer. The data type bits are stored in consecutive memory locations of the data type buffer.

In another aspect, the data buffer has a width wide enough to store data items designated as valid from at least an entire data block of the one or more data blocks.

In another aspect, the method includes, in response to accumulating data designated as valid in an amount sufficient to fill a row of the data buffer, writing the amount of data items designated as valid to the row of the data buffer.

In another aspect, the method includes, in response to accumulating the data type bits in an amount sufficient to fill a row of the data type buffer, writing the amount of data type bits to the row of the data type buffer.

In another aspect, the method includes encoding the data items designated as valid as read from the buffer based on the data type bits read from the buffer.

One or more embodiments relate to a system. The system includes one or more decoders. Each decoder includes a plurality of processing sections. Each processing section processes one or more bits of encoded data from a work buffer and generates a signal specifying whether the one or more bits of encoded data are a code or part of a code. Each decoder includes a switch configured to pass a data item output from a selected processing section of the plurality of processing sections. The switch selects the processing system as the selected processing section based on the signal generated by each processing section of the plurality of processing sections. Each decoder includes a de-mapper circuit configured to pass the data item in response to the data item being a literal, or output a length value or a distance value in response to the data item being a length or a distance. Each decoder includes an adder circuit configured to selectively increment the length value or the distance value based on whether the data item has one or more extra bits and a value specified by the one or more extra bits.

The foregoing and other implementations can each optionally include one or more of the following features, alone or in combination. Some example implementations include all the following features in combination.

In one aspect, each decoder includes a control signal decoder circuit configured to generate a control signal for controlling the switch based on the signal from each processing section of the plurality of processing sections specifying whether the one or more bits of encoded data are the code or part of the code.

In another aspect, each processing section is configured to process a different number of the one or more bits from the work buffer.

In another aspect, the one or more bits processed by each processing section that processes two or more bits are consecutive.

In another aspect, each processing section includes a memory configured to store a lookup table for deriving the data item from the code.

In another aspect, each processing section includes a comparator configured to compare a unique code offset with the one or more bits processed by the processing section to determine whether the one or more bits processed by the processing section are the code or part of the code.

In another aspect, wherein the data item is output from the memory of the selected processing section by indexing into the lookup table to an address generated based on a difference between the one or more bits processed by the selected processing section and the unique code offset for the selected processing section.

In another aspect, each processing section includes a subtraction circuit configured to generate the address.

In another aspect, the plurality of processing sections include N processing sections. A first of the plurality of processing sections is configured to process one bit of the one or more bits of encoded data from the work buffer. A last of the plurality of processing sections is configured to process N bits of the one or more bits of encoded data from the work buffer data.

In another aspect, the one or more decoders comprise a plurality of decoders. A first decoder of the plurality of decoders is configured to decode literals and lengths. A second decoder of the plurality of decoders is configured to decode distances.

One or more embodiments relate to a method. The method includes during each of a plurality of iterations, concurrently testing, by each processing section of a plurality of processing sections, whether one or more bits of encoded data are a first code or are part of a code. In each iteration, each processing section operates on a different set of the one or more bits of the encoded data and generates a signal specifying a result of the testing. The method includes, for each iteration, generating an address of a memory of a selected processing section based on the one or more bits of encoded data and outputting a data item derived from the one or more bits of encoded data processed by the selected processing section. The method includes testing the data items for the plurality of iterations to determine whether the data item is at least one of a literal, a length, or a distance. The method includes, for data items that are literals, outputting the literals. For data items that are lengths or distances, outputting a length value or a distance value and selectively updating the length value or the distance value based on whether the data item is associated with one or more extra bits and a value of the one or more extra bits.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of compressed data as output by the compression circuit of FIG. 2.

FIG. 6 illustrates an example of data packing implemented by the packing system of FIG. 2.

FIG. 8 illustrates a method of certain operative features of the receiver system of FIG. 2 in accordance with one or more embodiments of the disclosed technology.

DETAILED DESCRIPTION

Figure 1:
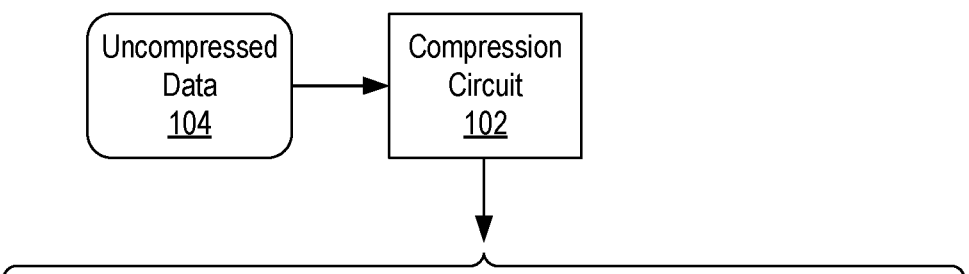
FIG. 1 illustrates an example of compressed data output from a compression circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to packing data for power and area efficient memory structures and performance-efficient decoding of encoded data. With reference to packing data, the manner in which data is packed can have a significant impact on different aspects of an electronic system including the cost and size of the system. In the case where data is conveyed from a source to a destination, the data is often buffered. The manner in which the data is packed for buffering in a memory may have a significant effect on the size of the memory used and, as such, the size and cost of the overall electronic system.

In accordance with the inventive arrangements described within this disclosure, methods and systems are described for packing data in a power and area efficient manner. The inventive arrangements are capable of packing data in a memory structure in reference to memory circuitry or a memory device. The memory structure, for example, may be used as a buffer. The data is packed, e.g., stored, in a manner that provides one or more technical effects including, but not limited to, requiring less memory than other conventional data packing techniques. Reducing the amount or size of memory required to buffer data provides further technical effects that include reducing the power consumed by the electronic system. These benefits are increased as a given electronic system, e.g., an IC, may include multiple instances of the example circuit architectures described herein. With each additional instance of such circuit architecture(s) being incorporated into an electronic system in lieu of other conventional data packing circuits, the amount of memory required and amount of power required by the electronic system may be further reduced.

In one or more embodiments, a controller is provided that is configured to receive compressed data. The compressed data includes data items and qualifier bits for, or corresponding to, the data items. The controller is capable of discarding those data items of the compressed data that are determined to be invalid based on the qualifier bits. The discarding of invalid data items may significantly reduce the amount of memory needed to store or buffer the compressed data as only valid data items are buffered. The controller is also capable of generating data type bits that specify data type information for the data items designated as valid by the qualifier bits. A buffer is provided. The buffer is capable of storing the packed data. The controller is capable of storing, e.g., packing, the valid data items and the data type bits in the buffer. The data type bits, as generated by the controller and buffered, facilitate accurate and error free interpretation of the packed data when read from the buffer by a downstream or destination system and/or circuit.

With reference to decoding data, the manner in which encoded data is decoded and the decoding circuit architecture can have a significant impact on different aspects of an electronic system. In the case where encoded data is conveyed from a source to a destination, the encoded data must be decoded efficiently to keep up with the high data throughput requirements of modern systems without consuming too much power or area. In accordance with the inventive arrangements described within this disclosure, methods and systems are described for decoding encoded data. The decoding circuit architecture described herein provides one or more technical effects including, but not limited to, increased data throughput. For example, the inventive arrangements are capable of achieving a data throughput of one symbol per clock cycle in a power and area efficient implementation.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of compressed data output from a compression circuit 102. For purposes of illustration, compression circuit 102 may implement an LZ77 compression algorithm. Compression circuit 102 is capable of compressing uncompressed data 104 received as input by identifying repeated occurrences of symbols (e.g., characters) therein. Compression circuit 102 replaces the repeated occurrences of sequences of one or more of the symbols with a Match Length-Distance (MLD) pair and outputs compressed data that includes literals and MLD pairs. In some examples, the output may be further compressed using an encoder such as one configured to perform Huffman encoding as set forth in RFC 1951 "Deflate Compressed Data Format Specification version 1.3." In the example of FIG. 1, compression circuit 102 is capable of implementing 1-byte per clock cycle compression and outputs one data block each clock cycle.

In the example of FIG. 1, each data block output from compression circuit 102 includes a single literal slot, a single match-length slot, a single distance slot, and an output qualifier. The literal slot is 8 bits, the match-length slot is 8 bits, and the distance slot is 15 bits. The data in the match-length slot and the data in the distance slot, taken collectively, is an MLD pair. Within this disclosure, the term "Match Length Distance slot" or the term "MLD slot" means a pair of a match-length slot and a distance slot of a same data block. The output qualifier is 2 bits. For purposes of illustration, the data block specified by row 1 is output on clock cycle 1, the data block specified by row 2 is output on clock cycle 2, and so forth. Each row, or data block, has 33 bits of data (e.g., 8+8+15+2).

The qualifier bits include a literal valid bit and an MLD pair valid bit. When the literal valid bit is 1, the literal slot of the same data block includes a valid literal. When the literal valid bit is 0, the literal slot of the same data block includes an invalid literal. When the MLD pair valid bit is 1, the match-length slot and the distance slot of the same data block contain a valid MLD pair. When the MLD pair valid bit is 0, the match-length slot and the distance slot of the same data block contain an invalid MLD pair. Within this disclosure, literals and MLD pairs (including a length and/or a distance) are referred to as data items as differentiated from the other bits in a data block such as the qualifier bits. For purposes of discussion herein, an invalid data item, whether an invalid literal or an invalid MLD pair, may be said to be a zero-valued data item or a null data item. Each of the data blocks corresponding to rows 1-5 have a valid literal and an invalid MLD pair. The data block corresponding to row 6 has an invalid literal and a valid MLD pair. The data block corresponding to row 7 has a valid literal and a valid MLD pair.

The match-length data item indicates the number of characters from a window of previously received characters that have been matched. The distance data item indicates the number of characters back from the current position the matched sequence having the length specified by the match-length data item starts.

In the example, the character "a" is received at clock cycle 1, the character "b" received at clock cycle 2, and so forth. By clock cycle 5, the data [a, b, c, d, e] has been received without matching any prior received characters as indicated by the lack of a valid MLD pair. In clock cycle 6, no literal is received, however the MLD pair is [3, 4] indicating that 3 characters have been matched a distance of 4 characters from the current location. In other words, the sequence [b, c, d] has been detected corresponding to the uncompressed sequence [a, b, c, d, e, b, c, d]. In clock cycle 7, a further literal is received as well as an MLD pair. The MLD pair of [5, 7] indicates that 5 characters have been matched a distance of 7 characters back from the current location. Given the uncompressed sequence [a, b, c, d, e, b, c, d], the sequence represented by clock cycle 7 is [a, b, c, d, e, b, c, d, f, c, d, e, b, c].

To encode the output generated by compression circuit 102, e.g., one configured to implement the LZ77 algorithm, the literals and the MLD pairs are stored in a memory structure that may be accessed by an encoder circuit. Using a conventional data packing approach that stores each row as illustrated in FIG. 1 requires a memory with a capacity of 270,336 bits to store the compressed output generated from 8 KB of input data (e.g., 33 bits per row times 8,192 bytes). The memory size grows significantly for larger input data sizes. For example, a memory structure with a capacity of 540,672 bits is required to store the compressed data generated from 16 KB of input data. A memory structure with a capacity of 1,081,344 bits is required to store the compressed data generated from 32 KB of input data. The required memory structure capacity (e.g., size) increases the memory footprint (e.g., physical size) as implemented in silicon in an IC or other electronic system. This can directly increase silicon area of the IC, power consumption of the IC, and cost of manufacturing the IC.

Figure 2:
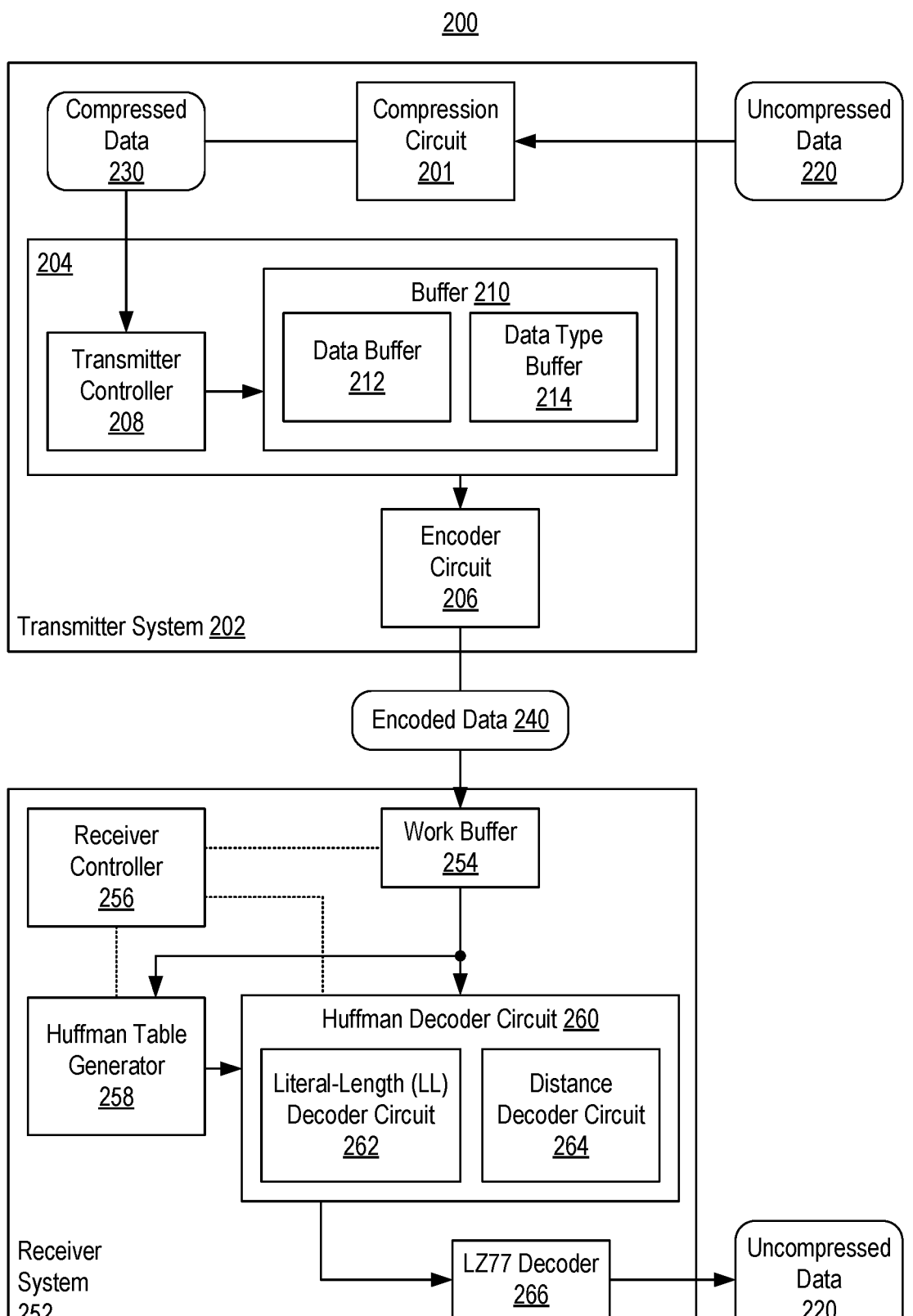
FIG. 2 illustrates an example of a data processing system in accordance with the inventive arrangements described within this disclosure.

FIG. 2 illustrates a data processing system (system) 200 in accordance with one or more embodiments of the disclosed technology. System 200 is an electronic system. In the example, system 200 includes a transmitter system 202 and a receiver system 252.

In one or more embodiments, system 200 is implemented as or within an IC. Examples of different ICs in which system 200 may be incorporated include, but are not limited to, Central Processing Units (CPUs), Graphics Processing Units (GPUs), Application-Specific ICs (ASICs), Digital Signal Processors (DSPs), programmable ICs (e.g., Field-Programmable Gate Arrays or "FPGAs"), Systems-on-Chips or "SoCs," and/or other hardware processors. A programmable IC is an IC that includes at least some programmable circuitry. Programmable logic is an example of programmable circuitry.

In one or more other embodiments, transmitter system 202 is implemented in a first IC while receiver system 252 is implemented in a second and different IC. For example, transmitter system 202 and receiver system 252 may be implemented in different devices separated by a communication channel over which encoded data is transmitted.

In the example of FIG. 2, transmitter system 202 includes a compression circuit 201, a packing system 204, and an encoder circuit 206. Packing system 204 includes a transmitter controller 208 and a buffer 210. In one or more embodiments, transmitter controller 208 is implemented as a hardware processor (e.g., a circuit configured to execute instructions or program code). In one or more other embodiments, transmitter controller 208 is implemented as control logic in circuitry (e.g., as a state machine). Transmitter controller 208 may be implemented as hardwired circuitry (e.g., circuitry fabricated with a dedicated or particular purpose) or as programmable circuitry. Similarly, packing system 204 may be implemented as hardwired circuitry (e.g., circuitry fabricated with a dedicated or particular purpose) or as programmable circuitry.

In the example, buffer 210 includes a data buffer 212 and a data type buffer 214. In one or more embodiments, data buffer 212 and data type buffer 214 are implemented as separate physical memory circuits each having their own respective read and/or write ports. In one or more alternative embodiments, data buffer 212 and data type buffer 214 are implemented as a single memory circuit. The single memory circuit may be organized or logically partitioned into two separate portions, segments, or partitions where one such portion stores data including literals and MLD pairs while the other stores data type bits. Buffer 210 (and/or data buffer 212 and/or data type buffer 214) are examples of memory structures and/or computer-readable storage media (i.e., devices).

In one or more embodiments, compression circuit 201 is configured to implement the LZ77 compression algorithm. Compression circuit 201 is capable of receiving uncompressed data 220, compressing uncompressed data 220, and outputting compressed data 230 in the form of one or more data blocks. Each data block may include a plurality of slots organized as a plurality of data slots and a plurality of bit-sized slots configured to store qualifier bits.

In general, packing system 204 is capable of receiving compressed data 230 output from compression circuit 201. Packing system 204 is capable of storing, or packing, compressed data 230 within buffer 210 in a selected format or using a selected packing technique.

Encoder circuit 206 is capable of reading data from buffer 210 and generating encoded data 240 from and/or based on the data read from buffer 210. In one or more embodiments, encoder circuit 206 is configured to perform Huffman encoding of the data stored in buffer 210 with the resulting data being output as encoded data 240.

In the example of FIG. 2, compression circuit 201 is capable of processing multiple bytes per clock cycle. Unlike the example of FIG. 1, in the example of FIG. 2, compression circuit 201 is capable of processing 3-bytes per clock cycle. Compression circuit 201 may perform comparisons of received literals albeit comparing 3 bytes per clock cycle rather than one byte per clock cycle. For example, compression circuit 201 may include a plurality, e.g., 3, data processing paths that operate concurrently to achieve 3-bytes per clock cycle operation.

In one or more embodiments, a system such as an IC may include one or more instances of the transmitter system 202 and/or packing system 204. Each instance may be implemented in the context of data compression or in another context or used with another application where efficient data packing, e.g., in terms of reduced power requirements and reduced memory size, is desired.

In the example of FIG. 2, receiver system 252 includes a work buffer 254, a receiver controller 256, a Huffman table generator 258, a Huffman decoder circuit 260, and an LZ77 decoder 266. Huffman decoder circuit 260 includes a literal-length (LL decoder circuit) and a distance decoder circuit 264. Within this disclosure, the LL decoder circuit 262 may be referred to as the "first decoder circuit" while the distance decoder circuit 264 may be referred to as the "second decoder circuit."

In general, encoded data 240 may be received by work buffer 254. Receiver controller 256 is capable of controlling operation of work buffer 254, Huffman table generator 258, and Huffman decoder circuit 260. For purposes of illustration, control signals in receiver system 252 are illustrated as dashed lines. Huffman table generator 258 is capable of decoding received Huffman tables for blocks of encoded data. Huffman table generator 258, operating under control of receiver controller 256, is capable of loading the Huffman table(s), as decoded, into LL decoder circuit 262 and distance decoder circuit 264 of Huffman decoder circuit 260.

In the example of FIG. 2, Huffman decoder circuit 260 is capable of decoding encoded data 240. For example, encoded data 240, as noted, may be Huffman encoded data. Huffman decoder circuit 260 is capable of decoding encoded data 240 and outputting data in the form of literals and MLD pairs. In one or more embodiments, Huffman decoder circuit 260 is capable of outputting literals and MLD pairs. In one or more embodiments, the literals and MLD pairs output from Huffman decoder circuit 260 are the same as, or in the same format as, those received in compressed data 230. Huffman decoder circuit 260 outputs the data to LZ77 decoder 266. For example, Huffman decoder circuit 260 outputs the data to a first-in-first-out (FIFO) memory within LZ77 decoder 266. LZ77 decoder 266 is capable of further decoding the data to recover the raw data originally provided to compression circuit 201 as uncompressed data 220.

The example embodiments described herein may be implemented in any of a variety of electronic systems including data processing systems and/or ICs in which a compression system, subsystem, or circuitry is implemented and/or in which a decoding system, subsystem, or circuitry is implemented. One or more embodiments include a system such as system 200. One or more other embodiments include a transmitter system such as transmitter system 202. One or more other embodiments include packing system 204. One or more other embodiments include receiver system 252. Still, one or more other embodiments, include Huffman decoder circuit 260 and/or Huffman decoder circuit 260 in combination with one or more other components of receiver system 252. One or more embodiments also may include a circuit architecture (e.g., FIG. 7) that implements LL decoder circuit 262 and/or distance decoder circuit 264. In any case, the example embodiments described herein may be implemented in any of a variety of electronic systems including data processing systems and/or ICs in which a compression system, subsystem, or circuitry is implemented and/or a decoding system, subsystem, or circuitry is implemented.

With reference to packing system 204, while the inventive arrangements are illustrated in the context of a system that utilizes data compression and encoding, in one or more embodiments, the inventive arrangements relating to packing system 204 may be implemented in other applications and/or contexts where area and/or power efficient memory structures are desired thereby making use of the data packing methods and systems disclosed herein.

FIG. 3 illustrates an example of compressed data 230 as output by compression circuit 201 of FIG. 2. In the example of FIG. 3, each data block of compressed data includes a plurality of literal slots, one match length slot, one distance slot, and a plurality of qualifier bit slots. In the example, each data block includes N different literal slots. For purposes of illustration, N is equal to 3. The plurality of qualifier bit slots include 4 qualifier bit slots.

For purposes of illustration, the same sequence of data illustrated in FIG. 1 is shown in FIG. 3 albeit organized differently in accordance with the format of data as output by compression circuit 201. As may be observed in FIG. 3, each row corresponds to a data block. Compression circuit 201 is capable of outputting one data block of compressed data each clock cycle. As illustrated in the example of FIG. 3, row 1 corresponding to a first data block is output in a first clock cycle, row 2 corresponding to a second data block is output in the next or second clock cycle, and row 3 corresponding to a third data block is output in the next or third clock cycle.

Whereas each data block in the example of FIG. 1 includes a single literal slot for a maximum of one literal, each data block in FIG. 3 includes a plurality of literal slots for a maximum of 3 literals. Each data block of FIG. 3 includes one MLD slot. A qualifier bit slot is provided for each literal and for the MLD pair resulting in a total of 4 qualifier bit slots for each data block.

In the example of FIG. 3, each data block includes a maximum of 3 literals requiring 3 bytes (e.g., of 1 byte for each literal), one MLD pair (e.g., 3 bytes formed of a 1-byte match-length and a 15-bit distance requiring 2 bytes), and 4 qualifier bits of data that must be buffered. The data blocks are buffered in buffer 210 using the packing techniques described herein for subsequent consumption by one or more downstream systems and/or circuits such as encoder circuit 206. Packing system 204 is capable of efficiently packing the data blocks as output from compression circuit 201 within buffer 210 for consumption by such downstream systems and/or circuits.

Figure 4:
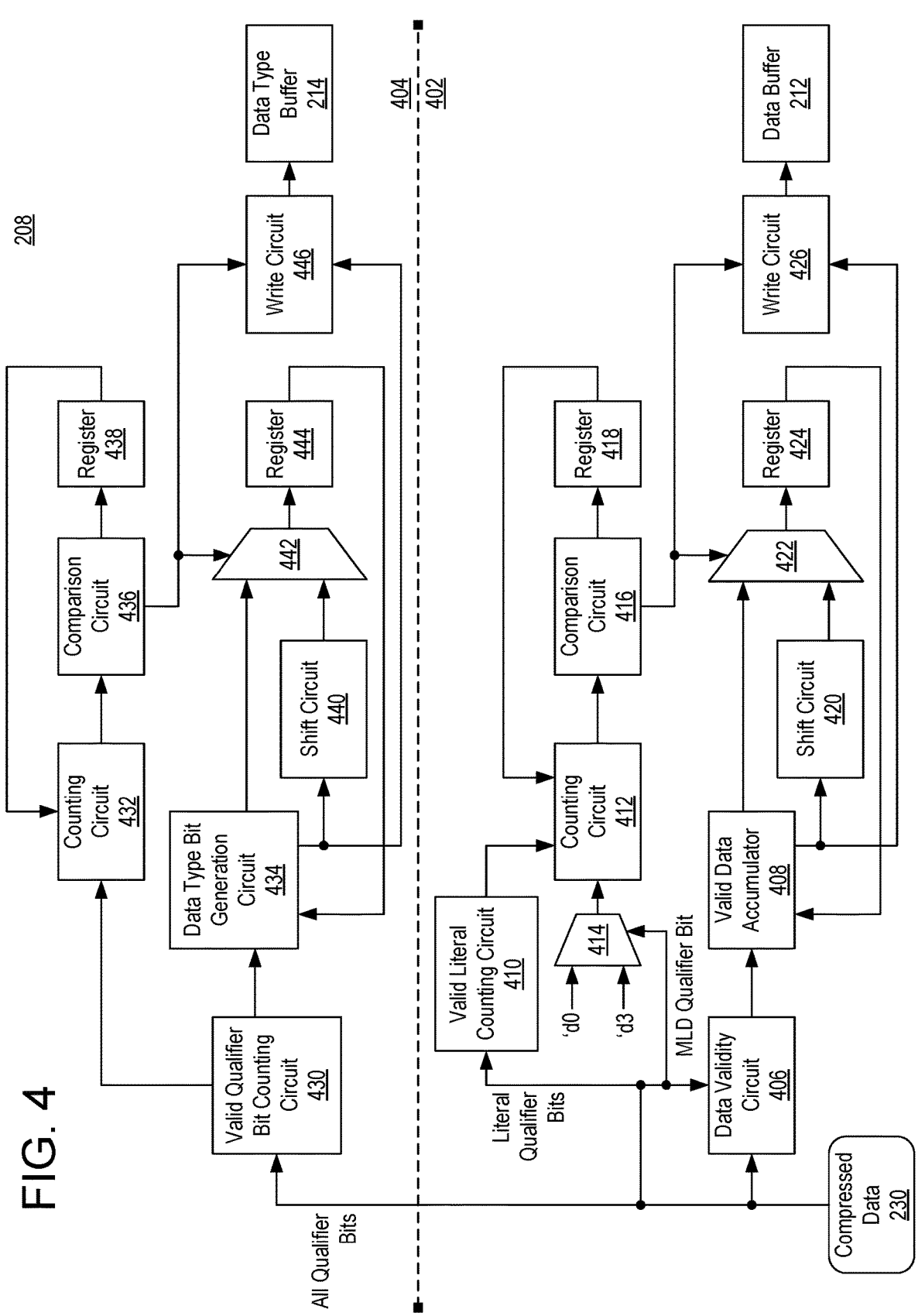
FIG. 4 illustrates an architecture for a controller of the packing system of FIG. 2 in accordance with one or more embodiments of the disclosed technology.

FIG. 4 illustrates an architecture for transmitter controller 208 of packing system 204 in accordance with one or more embodiments of the disclosed technology. In the example of FIG. 4, transmitter controller 208 is implemented as control logic in circuitry. Transmitter controller 208 may be implemented as hardwired (e.g., hardened) circuitry or using programmable circuitry.

In the example, transmitter controller 208 includes a channel 402 (e.g., a first channel) configured to process the valid data items (literals and MLD pairs) of compressed data 230 and write such valid data items to data buffer 212. Transmitter controller 208 includes a channel 404 (e.g., a second channel) configured to process the qualifier bits of compressed data 230 to generate the data type bits. Channel 404 writes the data type bits, as generated, to data type buffer 214.

Referring to channel 402, data validity circuit 406 receives both the data items and the qualifier bits of compressed data 230 as input. Data validity circuit 406 outputs only valid data items to valid data accumulator 408. Valid data accumulator 408 stores valid data items output from data validity circuit 406 within a buffer therein (not shown). For example, data validity circuit 406 outputs those data items for which the qualifier bit is true or set (e.g., =1).

The qualifier bits for the literals, labeled as "literal qualifier bits" in FIG. 4, of compressed data 230 are also provided to valid literal counting circuit 410. Valid literal counting circuit 410 generates a count specifying a number of the valid literals received each clock cycle and outputs that count to counting circuit 412. That is, valid literal counting circuit 410 outputs the number of literal qualifier bits that are set each clock cycle to counting circuit 412.

The single qualifier bit for the MLD pair, labeled as the "MLD qualifier bit" in FIG. 4, is provided to switch 414 as a control or select signal. In one or more embodiments, switch 414 is implemented as a multiplexer. The MLD qualifier bit controls whether switch 414 passes a value of 0 or a value of 3. In response to the MLD qualifier bit being set, switch 414 passes a value of 3 indicating that the current data block includes a valid MLD pair having a size of 3 bytes. In response to the MLD qualifier bit being cleared (e.g., =0), for example, switch 414 passes the value of 0 indicating that the current data block does not include a valid MLD pair.

Counting circuit 412 is capable of calculating a total amount of valid data (e.g., both literals and MLD pairs) received so far or remaining and accumulated since a prior write to data buffer 212. In doing so, for each clock cycle, counting circuit 412 calculates a sum of the value received from register 418 (e.g., the prior sum), the value from valid literal counting circuit 410 (the number of valid literals received for the current data block), and the value passed from switch 414 (the number of bytes of valid MLD pair data for the current data block).

Counting circuit 412 outputs the sum to comparison circuit 416. Comparison circuit 416 compares the sum to a first threshold. The first threshold is a data accumulation threshold specified in bytes. While the sum generated by counting circuit 412 is less than the first threshold, comparison circuit 416 continues to output the sum from counting circuit 412 to a next clock cycle corresponding to register 418. The value from register 418 is fed back to counting circuit 412 as the current sum to which the number of newly received valid data items (in bytes) for a next data block is added.

In response to the sum from counting circuit 412 meeting or exceeding the first threshold, comparison circuit 416 asserts a control signal to switch 422 and to write circuit 426, which causes write circuit 426 to write accumulated and valid data in valid data accumulator 408 to data buffer 212. In addition, in response to the sum from counting circuit 412 meeting or exceeding the first threshold, comparison circuit 416 also decrements the sum received from counting circuit 412 by the first threshold and writes the resulting value to register 418. The value of register 418, as decremented by the first threshold, is fed back to counting circuit 412 as the current sum to which the number of newly received valid data items of the next data block is added.

Switch 422 passes data from valid data accumulator 408 or from shift circuit 420 based on the value of the control signal from comparison circuit 416. In one or more embodiments, switch 422 is implemented as a multiplexer. In the example, while the sum calculated by counting circuit 412 is less than the first threshold, the control signal from comparison circuit 416 is not asserted, which causes switch 422 to pass data from valid data accumulator 408 to register 424, which is fed back to valid data accumulator 408. This operation ensures that newly received data is correctly appended or added to prior data as accumulated in valid data accumulator 408.

In response to the sum calculated by counting circuit 412 being greater than or equal to the first threshold, the control signal from comparison circuit 416 is asserted, which causes switch 422 to pass data from shift circuit 420 to register 424, which is fed back to valid data accumulator 408. As may be appreciated, shift circuit 420 maintains a shifted version of the data in valid data accumulator 408. The shifted version of the data is a copy of the valid data from valid data accumulator 408 albeit with the M least significant bytes of data being dropped (e.g., discarded). In this example, M is equal to the first threshold. In each clock cycle, shift circuit 420 receives a copy of the valid data items from valid data accumulator 408 and shifts the received data by the first threshold (e.g., by the data accumulation threshold). This operation allows switch 422 to select the shifted version of data items in response to the control signal from comparison circuit 416 being asserted so that any data in valid data accumulator 408 that is not written in a given clock cycle is maintained in valid data accumulator 408. For example, since write circuit 426 writes an amount of data equal to the first threshold, any remaining data is written back to valid data accumulator 408 to be written by write circuit 426 in a next write operation. Shift circuit 420 in combination with switch 422 and register 424 implement this functionality.

Continuing with channel 404, only the qualifier bits of compressed data 230 are passed to channel 404. Valid qualifier bit counting circuit 430 counts the number of valid qualifier bits, which is the number of qualifier bits that are set for the current data block, and outputs the number of valid qualifier bits to counting circuit 432 each clock cycle. Valid qualifier bit counting circuit 430 passes the original qualifier bits to data type bit generation circuit 434.

In the example, data type bit generation circuit 434 generates the data type bits and accumulates the data type bits as generated in a buffer therein. Data type bit generation circuit 434 generates data type bits in accordance with Table 1 below.

TABLE 1

| Input | Output |
|---|---|
| 1 valued literal qualifier bit | 1 valued data type bit generated |
| 0 valued literal qualifier bit | No data type bit generated |
| 1 valued MLD pair qualifier bit | 0 valued data type bit generated |
| 0 valued MLD pair qualifier bit | No data type bit generated |

In the example, counting circuit 432 is capable of calculating a total amount of valid qualifier bits received so far or remaining and accumulated since a prior write to data type buffer 214. In doing so, for each clock cycle, counting circuit 432 calculates a sum of the value received from register 438 (e.g., the prior sum) and the number of valid qualifier bits received in the current data block. Counting circuit 432 provides the sum to comparison circuit 436.

Comparison circuit 436 compares the sum to a second threshold. The second threshold is a data type bit accumulation threshold specified as a number of bits. While the sum from counting circuit 432 is less than the second threshold, comparison circuit 446 continues to output the sum from counting circuit 432 to the next clock cycle corresponding to register 438. The value stored in register 438 is fed back to counting circuit 432 as the current sum to which the number of newly received valid qualifier bits for a next data block is added.

In response to the sum from counting circuit 432 meeting or exceeding the second threshold, comparison circuit 436 asserts a control signal to switch 442 and to write circuit 446, which causes write circuit 446 to write accumulated data type bits in data type bit generation circuit 434 to data type buffer 214. In addition, in response to the sum from counting circuit 432 meeting or exceeding the second threshold, comparison circuit 436 also decrements the sum received from counting circuit 432 by the second threshold and writes the resulting value to register 438. The value of register 438, as decremented by the second threshold, is fed back to counting circuit 432 as the current sum to which a count of newly received valid qualifier bits for the next data block is added.

Switch 442 passes data from data type bit generation circuit 434 or from shift circuit 440 based on the value of the control signal from comparison circuit 436. In one or more embodiments, switch 442 is implemented as a multiplexer. In the example, while the sum calculated by counting circuit 432 is less than the second threshold, the control signal from comparison circuit 436 is not asserted, which causes switch 442 to pass data from data type bit generation circuit 434 to register 444. The value from register 444 is fed back to data type bit generation circuit 434. This operation ensures that newly generated data type bit(s) are correctly appended or added to prior generated data type bits and accumulated in data type bit generation circuit 434.

In response to the sum calculated by counting circuit 432 being greater than or equal to the second threshold, the control signal from comparison circuit 436 is asserted, which causes switch 442 to pass data from shift circuit 440 to register 444, which is fed back to data type bit generation circuit 434. As may be appreciated, shift circuit 440 maintains a shifted version of the data in data type bit generation circuit 434. The shifted version of the data is a copy of the data type bits as generated albeit with the N least significant bits of data being dropped (e.g., discarded). In this example, N is equal to the second threshold. In each clock cycle, shift circuit 440 receives a copy of the data from data type bit generation circuit 434 and shifts the received data by the second threshold (e.g., by the data type bit accumulation threshold). This operation allows switch 442 to select the shifted version of the data type bits in response to the control signal from comparison circuit 436 being asserted so that any data type bit(s) in data type bit generation circuit 434 not written in a given clock cycle are maintained in data type bit generation circuit 434. For example, since write circuit 446 writes an amount of data equal to the second threshold, any remaining data is written back to data type bit generation circuit 434 to be written in a next write operation. Shift circuit 440 in combination with switch 442 and register 444 implements this functionality.

FIG. 4 illustrates that channel 402 and channel 404 operate independently in that each channel is configured to write data based on accumulating a particular amount of data as specified by the respective threshold. Independent operation accommodates the operating reality that the particular mix of valid and/or invalid data items received each clock cycle is unknown. A one-to-one relationship between valid data items and data type bits may not be maintained given the size of an MLD pair in relation to a literal. In one or more example implementations, each threshold may be sized according to the width of a row of the corresponding buffer. For example, the first threshold may be equal to a width of data buffer 212. The second threshold may be equal to a width of the data type buffer 214.

Figure 5:
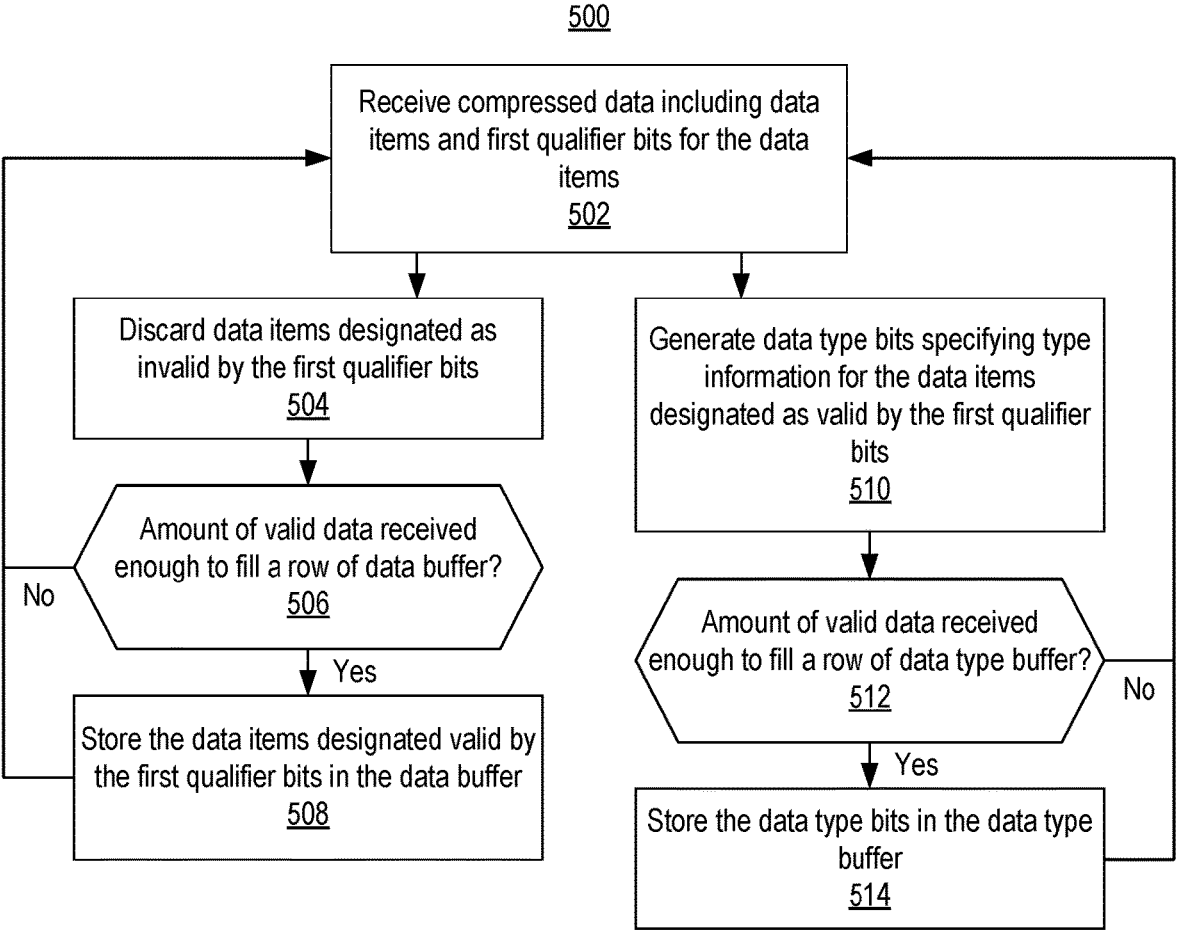
FIG. 5 illustrates an example method of certain operative features of the packing system of FIG. 2.

FIG. 5 illustrates an example method 500 of certain operative features of packing system 204. It should be appreciated that the method of FIG. 5 may be implemented by packing system 204 whether implemented as a processor executing program code or as illustrated in FIG. 4. Within the description that follows, references to components of FIG. 4 are included. Still, as noted, such operations may be performed by a processor executing program code.

Accordingly, referring to FIGS. 2, 3, 4, and 5, in block 502, transmitter controller 208 receives compressed data 230. Compressed data 230 includes data items and qualifier bits for the data items. In one or more embodiments, the data items include a plurality of literals and a plurality of MLD pairs. For example, compressed data 230 may be received as one or more data blocks. Each data block includes a plurality of literal slots, one match length slot, and one distance slot (e.g., one match-length-distance or MLD slot).

As discussed in connection with FIG. 3, in one or more embodiments, transmitter controller 208 is configured to receive one data block each clock cycle. For purposes of illustration, the data blocks illustrated in FIG. 3 are referred to using the row numbers where data block 1 is formed of the data specified in row 1, data block 2 is formed of the data specified in row 2, and data block 3 is formed of the data specified in row 3.

For purposes of illustration, in block 502, transmitter controller 208 receives data block 1. Referring to FIG. 3, data block 1 includes three valid literals and an invalid MLD pair. Invalid data may be any of a variety of symbols or characters. In some examples, invalid data may be specified as a null or a zero-valued data item. Referring to the example of FIG. 4, compressed data 230 may be received by the respective channels 402 and 404. For purposes of illustration, blocks 504, 506, and 508 illustrate processing performed by channel 402 while blocks 510, 512, and 514 illustrate processing performed by channel 404.

Continuing with block 504, transmitter controller 208 discards the data items designated as invalid by the qualifier bits. Each qualifier bit specifies a validity state of a data item stored in a corresponding slot of the same data block. In this regard, the validity state indicated by a qualifier bit also corresponds to the particular data item in the corresponding slot. For example, each qualifier bit specifies whether a corresponding literal slot or a corresponding MLD slot of the same data block stores a valid data item. In this example, transmitter controller 208, based on evaluation of the qualifier bits, recognizes that each of the three literal slots 0, 1, and 2 of data block 1 contains valid data (e.g., valid literals) therein and that the MLD slot of data block 1 does not contain valid data (contains an invalid MLD pair). In this example, transmitter controller 208 discards the MLD pair as being invalid. For example, data validity circuit 406 of transmitter controller 208 may discard invalid data items as described with reference to FIG. 4.

In block 506, transmitter controller 208 determines whether the amount of valid data received so far is enough to fill a row of data buffer 212. For example, transmitter controller 208 may accumulate those data items designated as valid (e.g., literals and/or MLD pairs). Since the valid data items are stored in data buffer 212, the determination of whether the amount of valid data received so far is enough to fill a row of buffer 210 is performed by transmitter controller 208 with reference to data buffer 212. Accordingly, in response to determining that an amount of the valid data accumulated is greater than or equal to the amount of data that may be stored in a row of data buffer 212, e.g., the first threshold, method 500 may continue to block 508. In response to determining that the amount of valid data accumulated is less than the amount of data that may be stored in a row of data buffer 212, method 500 may loop back to block 502 to continue operating.

In one or more embodiments, data buffer 212 may be implemented or configured with a width wide enough to store data items designated as valid from at least one entire data block of the one or more data blocks. That is, data buffer 212 has a width that is wide enough to store the valid data of at least one entire data block in the case where all literals and the MLD pair of the data block are valid. In an example implementation, and for purposes of illustration, data buffer 212 may have a width of 9 bytes.

With reference to FIG. 4, for example, comparison circuit 416 is configured to write data in response to a row of data for data buffer 212 being accumulated. For purposes of illustration and continuing with the prior example, in response to accumulating 9 bytes of data (e.g., 9 bytes of literals and/or MLD pairs), comparison circuit 416 initiates a write operation into data buffer 212. In this example, the first threshold is set to 9 bytes.

In one or more embodiments, block 506 may be optional. For example, in one or more other embodiments, transmitter controller 208 may write valid data items as received on a per-data block basis (e.g., without utilizing a first threshold to trigger writes to data buffer 212).

In this example, since the valid data items of data block 1 require only 3 bytes to store (e.g., the sum of counting circuit 412 is 3), which is less than a row of data buffer 212, method 500 may loop back to block 502.

Continuing with block 510, transmitter controller 208 generates data type bits specifying data type information for valid data items. Each data type bit specifies data type information for a valid data item. More particularly, each data type bit indicates the particular type of a valid data item as being a literal or an MLD pair. For example, referring to data block 1, transmitter controller 208 generates one data type bit for each valid data item. For a valid literal, the data type bit is set to 1. For a valid MLD pair, the data type bit is set to 0. Appreciably, the data type bits may be set in the inverse so long as any other systems accessing data packed by packing system 204 use the same convention. Accordingly, for data block 1, the data type bits will be [1, 1, 1]. For each data block processed by transmitter controller 208, the number of data type bits generated is equivalent to the number of valid data items of the particular data block being processed. Thus, the number of data type bits generated and the number of valid data items may vary for each data block received. For example, data type bit generation circuit 434 of transmitter controller 208 may generate the data type bits as described with reference to FIG. 4.

In block 512, transmitter controller 208 determines whether the amount of data type bits generated so far is enough to fill a row of data type buffer 214. For example, transmitter controller 208 may accumulate the data type bits. Since the data type bits are stored in data type buffer 214, the determination of whether the amount of data type bits generated so far is enough to fill a row of buffer 210 is performed by transmitter controller 208 with reference to data type buffer 214. Accordingly, in response to determining that an amount of the data type bits generated is greater than or equal to the amount of data that may be stored in a row of data type buffer 214, method 500 may continue to block 514. In response to determining that the amount of data type bits generated is less than the amount of data that may be stored in a row of data type buffer 214, method 500 may loop back to block 502 to continue operating.

In one or more embodiments, data type buffer 214 may be configured to have a width wide enough to store data type bits for a data block having 4 valid data items (e.g., 4 data type bits). In an example implementation, and for purposes of illustration, data type buffer 214 may have a width of 4 bits.

With reference to FIG. 4, for example, comparison circuit 436 is configured to write data in response to a row of data for data type buffer 214 being accumulated. For purposes of illustration, in response to accumulating 4 bits of data, e.g., 4 data type bits, comparison circuit 436 initiates a write operation into data type buffer 214. In this example, the second threshold is set to 4 bits. As may be observed, the writing initiated by write circuit 426 and write circuit 446 may occur at different times owing to the different widths of data buffer 212 and data type buffer 214.

In one or more embodiments, block 512 may be optional. For example, in one or more other embodiments, transmitter controller 208 may write data type bits as generated on a per-data block basis (e.g., without utilizing a second threshold to trigger writes to data type buffer 214).

In this example, since the data type bits generated for data block 1 are only 3 in number (e.g., the sum generated by counting circuit 432 is 3), method 500 may loop back to block 502.

In a second iteration of method 500, at block 502, data block 2 is received. Data block 2 includes 2 valid literals and a valid MLD pair. The invalid literal in literal slot 2 is discarded. In the example, the data type bits generated will be [1, 1, 0] indicating that the first valid data item is a valid literal, the second valid data item is a valid literal, and the third valid data item is a valid MLD pair. The number of bytes required to store the valid data items of data block 2 is 5. The total number of bytes of accumulated and valid data is now 8 (e.g., 3+5). Accordingly, after receiving data block 2, in block 506, method 500 again loops back to block 502.

The number of data type bits in the second iteration now totals 6 (e.g., 3+3). Since 6 exceeds the second threshold of 4 bits, method 500 continues from block 512 to block 514 where write circuit 446 writes 4 data type bits to data type buffer 214. The 2 remaining data type bits, as held in shift circuit 440, may be fed back to data type bit generation circuit 434 and stored in the buffer there until an additional 2 data type bits are generated and accumulated for a subsequent write operation by write circuit 446.

In block 514, transmitter controller 208 is capable of storing a row of data type bits in data type buffer 214. Transmitter controller 208, e.g., write circuit 446, stores the data type bits in data type buffer 214. After block 514, method 500 may loop back to block 502 to continue processing.

In one or more embodiments, the data type bits may be stored in consecutive memory locations of buffer 214. Data type buffer 214 is configured to store the data type bits. Accordingly, data type bits generated that correspond to or describe accumulated and valid data items stored in data buffer 212 may be accumulated and stored in consecutive memory locations of data type buffer 214.

In a third iteration of method 500, at block 502, data block 3 is received. Data block 3 includes one valid literal and one valid MLD pair. The invalid literals of literal slots 1 and 2 are discarded. In the example, the data type bits generated for data block 3 will be [1, 0] indicating that the first valid data item is a valid literal and the second valid data item is a valid MLD pair. The number of bytes required to store the valid data items of data block 3 is 4. The total number of bytes of accumulated and valid data is now 12 (e.g., 8+4). Since 12 exceeds the first threshold of 9 bytes, method 500 branches from block 506 to block 508 where write circuit 426 writes a row of valid data, e.g., 9 bytes of valid data, to data buffer 212. The remaining 3 bytes of valid data, as held in shift circuit 420, may be fed back to valid data accumulator and stored in the buffer therein until 6 additional valid bytes of data are accumulated for a subsequent write operation by write circuit 426.

Continuing with block 508, transmitter controller 208 is capable of storing the data items of compressed data 230 designated by the qualifier bits as valid in data buffer 212. For example, the storing operation performed by transmitter controller 208 may include storing each valid literal and each valid MLD pair as accumulated within buffer 212. More particularly, transmitter controller 208, e.g., write circuit 426, stores each valid data item in data buffer 212. After block 508, method 500 may loop back to block 502 to continue processing.

It should be appreciated that after the third iteration, the data type bits as accumulated will again be written to data type buffer 214 since the number of accumulated data type bits will be equal to the second threshold. As illustrated, after the second iteration, 2 data type bits remained in data type bit generation circuit 434. The 2 additional data type bits generated in the third iteration results in all 4 data type bits being written to data type buffer 214.

In one or more embodiments, the data items designated as valid, e.g., valid literals and valid MLD pairs may be stored in consecutive memory locations of data buffer 212. Data buffer 212 is configured to store the data items designated as valid.

With the data being stored, as packed, in buffer 210, another circuit and/or system may read the data and utilize the data for another purpose. For example, encoder circuit 206 is capable of encoding the data items designated as valid as read from buffer 210 based on the data type bits read from buffer 210. More particularly, in reading the valid data items from data buffer 212, the consuming system, in this example encoder circuit 206, will know whether each data item as read is a literal or an MLD pair based on the corresponding qualifier bit of the data type bits read from data type buffer 214.

Though not specifically illustrated in the example of FIG. 5, in one or more embodiments, in cases where no further compressed data is received, any remaining valid data items and/or data type bits may be written to the respective buffers despite being in quantities that are less than the respective thresholds.

FIG. 6 illustrates an example of data packing implemented by packing system 204. FIG. 6 illustrates data as packed, or stored, in buffer 210 by transmitter controller 208. In the example, the state of buffer 210 corresponds to the state that exists after having processed and stored each of data blocks 1, 2, and 3 (e.g., presuming data block 3 is the last data block received). In writing data to consecutive memory locations, data is written in the example from right to left in each row. Once a row is filled, writing may continue by wrapping to the next row and again writing data from right to left.

It should be appreciated that in the packing example illustrated in FIG. 6, the rows shown in each of data buffer 212 and data type buffer 214 do not correspond to data blocks. Rather data buffer 212 stores only valid data items. The number of valid data items stored in a row will depend on the particular mix of valid literals and/or valid MLD pairs. In this regard, the number of valid data items stored in any given row may vary. The number of data type bits stored in data type buffer 214 and as stored in each row of data type buffer 214 will remain constant. As discussed, the data type bits discussed herein do not indicate validity of the corresponding data item as each data item stored in data buffer 212 is valid. Rather, each data type bit indicates or specifies the type of the valid data item as being either a literal or an MLD pair.

In the example of FIG. 6, transmitter controller 208 writes only those data items that were designated as valid by the qualifier bits as output from compression circuit 201. Each valid data item stored in data buffer 212 is described by a corresponding data type bit, e.g., on a one-to-one basis. For example, referring to data buffer 212 in the first row and moving right to left, the valid data items are: a; b; c; d; e; [3, 4]; f. Accordingly, the corresponding date type bits in data type buffer 214 moving right to left starting in the first row are: 1, 1, 1, 1, which correspond to each of literals a, b, c, and d, respectively. The "1" value of each data type bit in the first row of data type buffer 214 indicates that each respective symbol "a," "b," "c," and "d" is a literal. Starting in the second row of data type buffer 214, the data type bits are: 1, 0, 1, which correspond to e; [3, 4]; f. In this example, the "1" value of the first data type bit in row 2 of data type buffer 214 indicates that the symbol "e" is a literal. The "0" value of the second data type bit in row 2 of data type buffer 214 indicates that the next data item [3, 4] is an MLD pair. The "1" value of the third data type bit in row 2 of data type buffer 214 indicates that the symbol "f" is a literal. The size of each literal is predetermined in these examples to be 8 bits. The size of each MLD pair is predetermined to be stored in 24 bits (e.g., 3 bytes) despite only requiring 23 bits.

Continuing with the second row of data buffer 212, the MLD pair [5, 7] is stored. The last data type bit stored in the second row of data type buffer 214 (e.g., the bit at the left end of the second row) is a 0 indicating that the corresponding valid data item stored in data buffer 212 is an MLD pair.

In the example of FIG. 6, and as described in connection with FIGS. 4 and 5, transmitter controller 208 writes a row of data in data buffer 212 in response to having an amount (e.g., number of bytes) of valid data items sufficient to fill the row. Similarly, transmitter controller 208 writes a row of data type bits in response to having a number of data type bits sufficient to fill the row. In this example, row 1 of data buffer 212 is written in response to controller accumulating 9 bytes of valid data. Row 2 of data buffer 212 is written in the example in the case where no further compressed data is received. Otherwise, transmitter controller 208 would await further valid data items (e.g., an additional 6 bytes of valid data) to complete the second row prior to writing valid data items to data buffer 212. In the example, transmitter controller 208 accumulates 4 data type bits and, in response, writes row 1 of data type buffer 214, then accumulates 4 additional data type bits and, in response, writes row 2 of data type buffer 214.

In the example of FIG. 6, for input data sizes of 8 KB, 16 KB, and 32 KB, the depth of the data buffer 212 would be 911, 1821, and 3641, respectively, and the depth of the data type buffer 214 would be 2048, 4096, and 8192, respectively. Thus, the effective memory size (e.g., size of buffer 210) required to store the LZ77 output for the input data sizes of 8 KB, 16 KB and 32 KB is 73784, 147496, and 294920 bits respectively. As may be observed, the size of the memory structures required in the example of FIG. 6 using the inventive arrangements is approximately ¼th of the size of the memory structure required for conventional techniques as described in connection with FIG. 1 (e.g., 1-byte per clock cycle compression). The inventive arrangements reduce memory utilization by approximately, or up to, 72% for input data of 8 KB in size compared against the traditional way of storing the whole LZ77 output data operating at 1-byte per clock cycle.

Figure 7A:
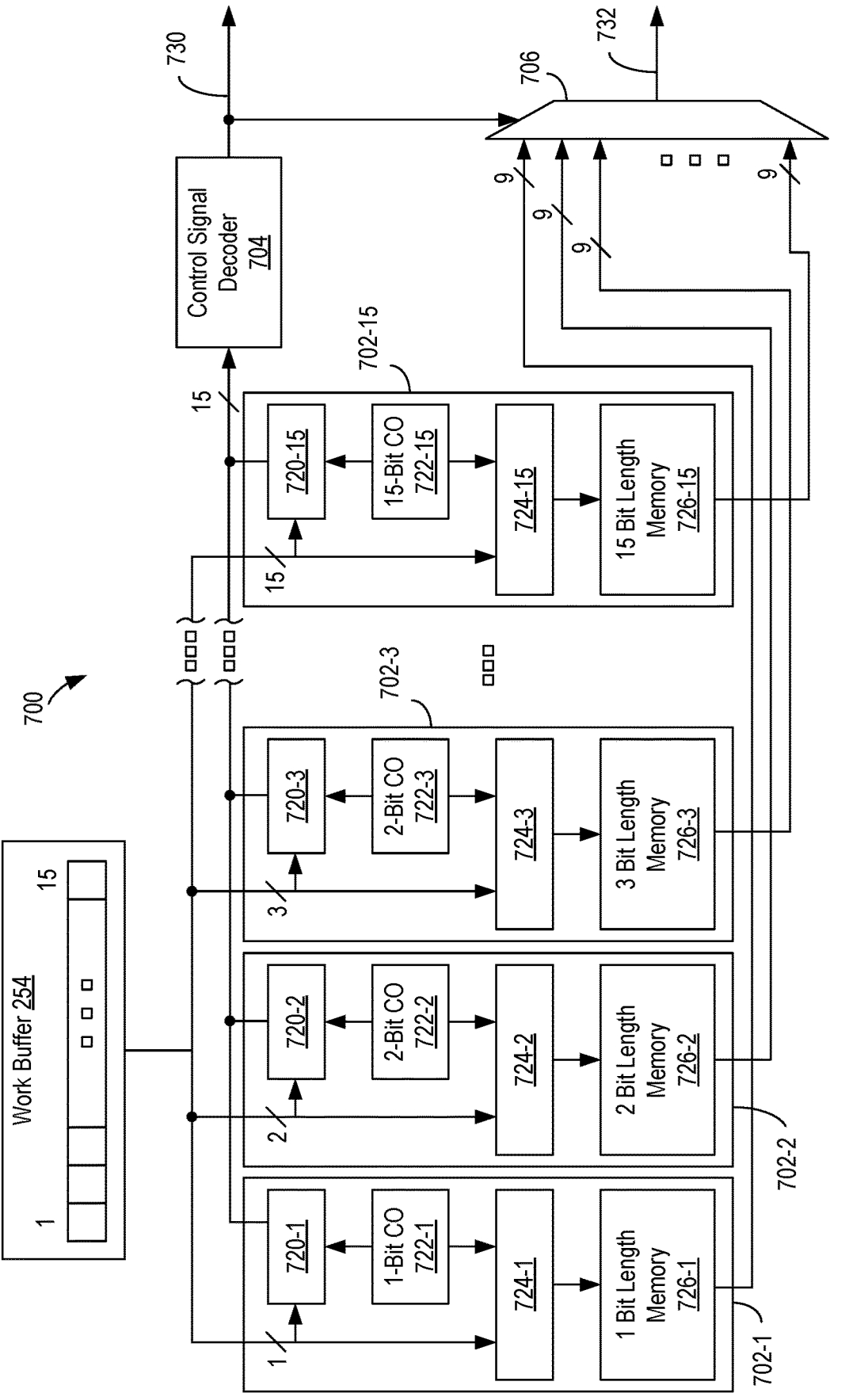
FIGS. 7A and 7B, taken collectively, illustrate certain operative features of a Huffman decoder circuit in accordance with one or more embodiments of the disclosed technology.
Figure 7B:
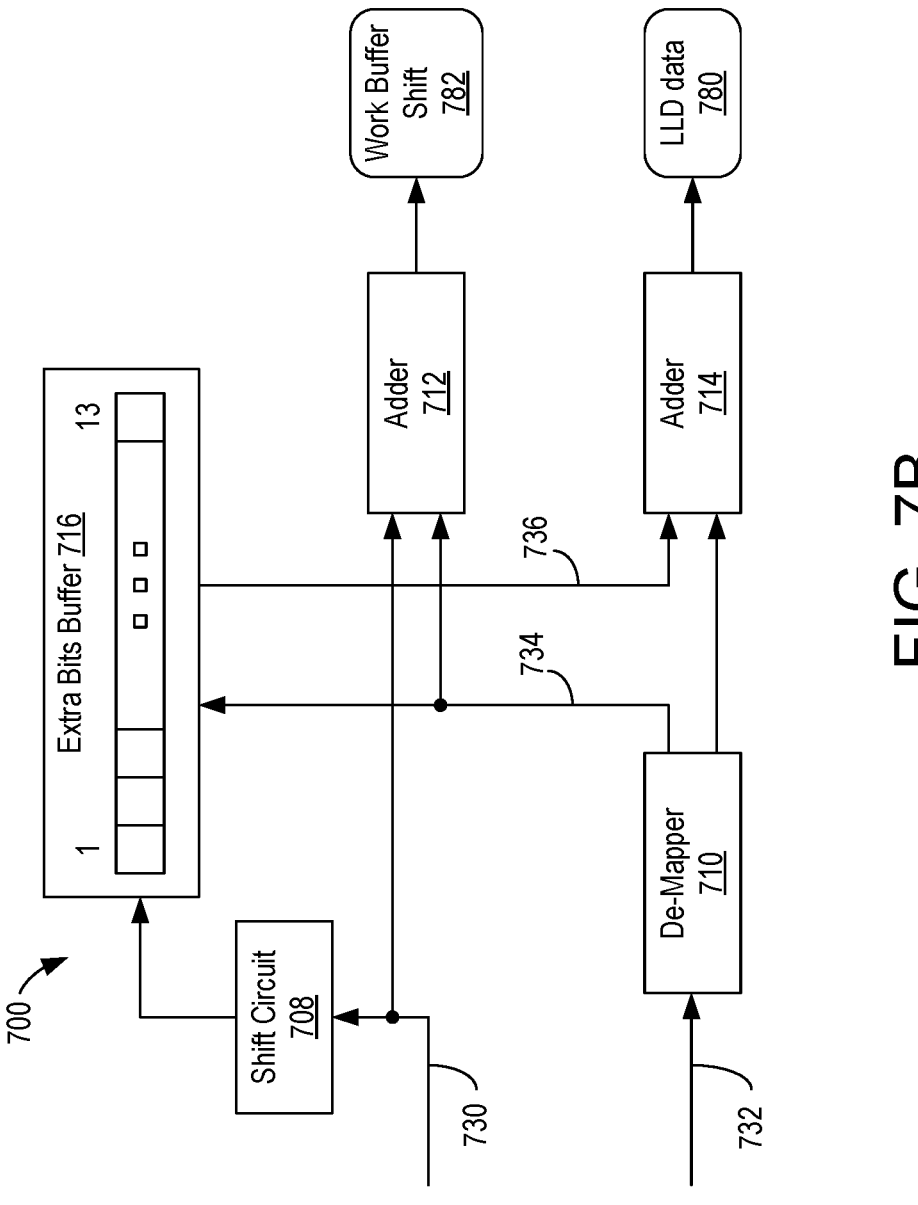

FIGS. 7A and 7B, taken collectively and collectively referred to as FIG. 7, illustrate certain operative features of Huffman decoder circuit 260 of FIG. 2 in accordance with one or more embodiments of the disclosed technology. More particularly, FIG. 7 illustrates an example circuit architecture 700 that may be used to implement LL decoder circuit 262 and to implement distance decoder circuit 264. That is, with the exception of work buffer 254, which is not considered part of circuit architecture 700, a first instance of circuit architecture 700 may be used to implement LL decoder circuit 262 and a second instance of circuit architecture 700 may be used to implement distance decoder circuit 264.

Appreciably, certain aspects of circuit architecture 700 may be adapted for use in implementing distance decoder circuit 264. For example, the data loaded into different registers and/or memories of circuit architecture 700 for the LL decoder circuit 262 implementation will differ from the data loaded into the respective registers and/or memories of circuit architecture 700 for the distance decoder circuit 264 implementation. Further, the width of certain memories such as memories 726, as described in greater detail below, may differ as well as the width of the data output from such memories. Operation of LL decoder circuit 262 and distance decoder circuit 264 may be coordinated by way of receiver controller 256 such that the two decoder circuits operate concurrently.

LL decoder circuit 262 is capable of decoding literal and length data that is Huffman encoded. Distance decoder circuit 264 is capable of decoding distance data that is Huffman encoded. The following describes the operation of circuit architecture 700 in decoding different Huffman encoded data items such as literals, lengths, and/or distances. It should be appreciated circuit architecture 700 will operate in substantially the same manner whether decoding literals, lengths, or distances.

As generally known, with variable length Huffman codes, each Huffman encoded symbol has a length that can range from 1 bit to 28 bits. When the "extra bits" of the Huffman code are excluded from consideration, the length ranges from 1 bit to 15 bits. Conventional decoder circuits that are able to decode variable length Huffman encoded data require multiple clock cycles to decode a single symbol. Circuit architecture 700 is capable of decoding one symbol each clock cycle thereby achieving greater data throughput. The circuit architecture of FIG. 7 is capable of achieving this improved data throughput in a power and area efficient design.

In the example of FIG. 7, circuit architecture 700 includes a plurality of processing sections 702, a control signal decoder 704, a switch 706, a shift circuit 708, a de-mapper 710, an adder 712, an adder 714, and an extra bits buffer 716. In FIG. 7, the number of processing sections 702 may be N, where N is an integer value. In this example, N is set to 15, which is the maximum number of bits of a variable length Huffman code excluding the extra bits that may accompany a length or a distance.

In the example, there are N=15 processing sections. Processing sections 702 are illustrated as 702-1, 702-2, and 702-3 through 702-15. Each processing section 702 includes a comparator 720, a register 722 configured to store a code offset, a subtraction circuit 724, and a memory 726. Each memory 726 is configured to store a lookup table. One characteristic of circuit architecture 700 is the use of memories 726 that are distributed across processing sections 702.

Each memory 726 is configured to store a lookup table that allows a received Huffman code to be mapped to a particular data item that may be stored as a binary value that may be output from the respective memory 726.

Encoded data 240 to be decoded is passed into work buffer 254 15 bits at a time. The encoded data in work buffer 254 may include literal-length (LL) codes, distance codes, and extra bits for lengths and/or distances. In the example, each processing section is configured to process one or more bits of encoded data obtained from work buffer 254. Processing section 702-1, e.g., a first processing section, is configured to process one bit of the one or more bits of encoded data from work buffer 254. Processing section 702-15, e.g., a last of the plurality of processing sections 702, is configured to process N bits, e.g., where N=15, of the one or more bits of encoded data from work buffer 254.

For example, processing section 702-1 processes the first bit of work buffer 254, processing section 702-2 processes the first two bits of work buffer 254 (e.g., bits 1 through 2), processing section 702-3 processes the first three bits of work buffer 254 (e.g., bits 1, 2, and 3), and so forth with each memory processing an additional consecutive bit such that processing section 702-15 processes all 15 bits of work buffer 254. In this regard, each processing section 702 is configured to process a different number of bits from work buffer 254. Further, the bits processed by each processing section 702 are consecutive bits.

In view of the foregoing, each processing section 702 is configured to process Huffman codes of a particular and unique length. Processing section 702-1 processes Huffman codes of 1 bit. Processing section 702-2 processes Huffman codes of 2 bits, processing section 702-3 processes Huffman codes of 3 bits, etc., with processing section 702-15 processing Huffman codes of 15 bits. Thus, the memory 726 of each respective processing section 702 will include only data for mapping codes of the particular Huffman code length for that processing section. In the case of memories 726 in an LL decoder circuit 262 implementation, the memories may be 9-bits in width and output data items of 9 bits in width. In the case of memories 726 in a distance decoder circuit 264 implementation, the memories may be 5-bits in width and output data items of 5 bits in width. In any case, each processing section 702 includes a memory 726 that is configured to store a lookup table therein for deriving data items (e.g., literals, lengths, or distances) from the encoded data.

For a given data block to be decoded, registers 722 are loaded with a code offset (CO) of the starting Huffman code for each code length. The term "data block," as used in reference to Huffman encoding/decoding (e.g., work buffer receiver system 252 and/or Huffman decoder circuit 260) is not the same as a data block in reference to FIG. 3. A data block for Huffman encoding/decoding refers to a portion of data for which same Huffman tables may be used for decoding as defined in the Huffman encoding specification (e.g., RFC 1951).

For purposes of illustration, consider processing section 702-3 which is configured to process Huffman codes of 3-bits in length. Table 2 below illustrates an example of the contents of the memory 726-3 for the processing section 702-3 (e.g., a lookup table).

TABLE 2

| Symbol | Huffman Code |
|--------|--------------|
| 66 | 000 |
| 67 | 001 |
| 68 | 010 |

TABLE 2-continued

| Symbol | Huffman Code |
|--------|--------------|
| 69 | 011 |
| 256 | 100 |
| 258 | 101 |
| 263 | 110 |

In the example of Table 2, the CO for processing section 702-3 as stored in register 722-3 is "000." The code offset is the first or base Huffman code for given code length (e.g., number of bits). Processing section 702-3 reads bits 1, 2, and 3 from work buffer 254. Each comparator 720 is configured to compare a unique code offset (e.g., the CO for the processing section 702) with the one or more bits processed by the processing section 702 to determine whether the one or more bits processed by the processing section are a code or are part of a code. For example, comparator 720-3 compares bits 1, 2, and 3 from work buffer 254 with the value of CO stored in register 722-3 and generates a signal indicating whether the bits obtained from work buffer 254 are a Huffman code or are part of a Huffman code.

In response to the value specified by bits 1-3 from work buffer 254 being greater than or equal to the value of the CO, which is 000 in this example, comparator 720-3 asserts a logic high on the 1-bit signal output therefrom to control signal decoder 704. A logic high indicates that the bits obtained from work buffer 254 are a Huffman code or may be part of a Huffman code. In response to the value specified by bits 1-3 from work buffer 254 being less than the value of the CO, comparator 720-3 generates a logic low on the 1-bit signal to control signal decoder 704. A logic low indicates that all of the bit(s) obtained from work buffer 254 by the processing section 702 are not part of a code. As each comparator 720 compares the CO for that processing region 702 with the number of bits pulled from work buffer 254, each will generate a signal based on the comparison. Appreciably, the CO for each processing section 702 will differ. Control signal decoder 704 receives each of the 1-bit signals (e.g., as a 15-bit signal taken collectively).

Subtraction circuits 724 are configured to generate addresses for indexing into the lookup table stored in the memory 726 of the same processing section 702. For example, subtraction circuits 724 subtract the CO stored in register 722 in the same processing section 702 from the bits obtained from work buffer 254 to generate an address that may be used to index into the memory 726. Referring to Table 2, in the case where bits 1-3 from work buffer 254 are 000, subtraction circuit 724-3 outputs a value of 0, which causes memory 726-3 to output the literal 66 from memory location 0 therein. As another example, in the case where bits 1-3 from work buffer 254 are 001, subtraction circuit 724-3 outputs an address of 1, which causes memory 726-3 to output the literal 67 from memory location 1 therein, and so forth.

In the example described above, each of comparators 720-1, 720-2, and 720-3 will assert a logic high to control signal decoder 704. Comparators 720-4 through 720-15 will generate a logic low to control signal decoder 704. Control signal decoder 704 is configured to generate a control signal for controlling switch 706 based on the signal from each processing section 702 of the plurality of processing sections specifying whether the one or more bits of encoded data are a code or are part of a code. In the example of FIG. 7, control signal decoder 704 is configured to determine the highest signal number (e.g., from 1-15) that is a logic high and generate a select signal 730 to switch 706 that selects the output, e.g., the data item, from that processing section to pass as signal 732. In this example, control signal decoder 704 generates a select signal 730 to switch 706 that chooses or selects the output from processing section 702-3 to pass as signal 732. Thus, switch 706 is configured to pass the data item output from the selected memory 726.

Control signal 730 is also provided to shift circuit 708. Signal 732 is provided to de-mapper 710. Extra bits buffer 716 maintains a copy of the encoded data stored in work buffer 754 albeit shifted by a number of bits equal to the length of the Huffman code determined and specified by signal 730. Referring to the prior example where the output from memory 726-3 was passed as signal 732, shift circuit 708 shifts the data in extra bits buffer 716 by 3 bits. Extra bits buffer 716 need only store a total of 13 bits, which is the maximum number of extra bits that may be used for the variable length Huffman codes. As known, the extra bits are used for selected length codes and for selected distance codes.

De-mapper 710 is configured to pass the data item specified by signal 732 in response to the data item being a literal and output a length value or a distance value in response to the data item being a length or a distance. For example, de-mapper 710, in the case of LL decoder circuit 262, is capable of storing a table of length codes. Table 3 below illustrates an example of the length code data that may be stored in a memory of de-mapper 710.

TABLE 3

| Code | Extra Bits | Length(s) |
|------|-----------|-----------|
| 257 | 0 | 3 |
| 258 | 0 | 4 |
| 259 | 0 | 5 |
| 260 | 0 | 6 |
| 261 | 0 | 7 |
| 262 | 0 | 8 |
| 263 | 0 | 9 |
| 264 | 0 | 10 |
| 265 | 1 | 11, 12 |
| 266 | 1 | 13, 14 |
| 267 | 1 | 15, 16 |
| 268 | 1 | 17, 18 |
| 269 | 2 | 19-22 |
| 270 | 2 | 23-26 |
| 271 | 2 | 27-30 |
| 272 | 2 | 31-34 |
| 273 | 3 | 35-42 |
| 274 | 3 | 43-50 |
| 275 | 3 | 51-58 |
| 276 | 3 | 59-66 |
| 277 | 4 | 67-82 |
| 278 | 4 | 83-98 |
| 279 | 4 | 99-114 |
| 280 | 4 | 115-130 |
| 281 | 5 | 131-162 |
| 282 | 5 | 163-194 |
| 283 | 5 | 195-226 |
| 284 | 5 | 227-257 |
| 285 | 0 | 258 |

De-mapper 710 is configured to compare the value of the data item received on signal 732 with the codes in Table 3. In the case of LL decoder circuit 262, the value may specify a literal, an end of block, or a length. Only lengths will have the potential for having extra bits. From Table 3, de-mapper 710 signals extra bits buffer 716 to output the number of bits specified by the extra bits column, if any, as specified by signal 734. The extra bits that are output, if any, start from position 1 of extra bits buffer 716. The value specified by the extra bits is provided to adder 714 via signal 736. Adder 714 is configured to selectively increment the length value or the distance value based on whether the data item has extra bits and a value specified by the extra bits.

For purposes of illustration, consider an example in which circuit architecture 700 implements LL decoder circuit 262 and signal 732 specifies a value of 257. In that case, de-mapper 710 determines, based on Table 3, that there are no extra bits needed and outputs a value of 3 as the length to adder 714. Adder 714 receives no value or a zero value via signal 736 from extra bits buffer 716 and, as such, outputs the value of 3 (e.g., 3+0) as the length for LLD data 780.

Consider another example in which circuit architecture 700 implements LL decoder circuit 262 and signal 732 specifies a value of 265. In this case, de-mapper 710 determines, based on Table 3, that one extra bit is needed. The bit from position 1 in extra bits buffer 716 is provided to adder 714 via signal 736. De-mapper 710 also outputs the lowest of the two lengths for 265 which is 11 in this case. The final value for the length is determined by the value of the extra bits obtained from extra bits buffer 716. If, for example, signal 736 specifies an extra bit value of 0, adder 714 outputs 11 as the length (e.g., 11+0) for LLD data 780. If, for example, signal 736 specifies an extra bit value of 1, adder 714 outputs 12 as the length (e.g., 11+1) for LLD data 780.

In the case where circuit architecture 700 implements LL decoder circuit 262 and the value specified by signal 732 is a literal (e.g., a value of 0-255), de-mapper 710 determines that no extra bits are needed. Further, no mapping of the value using Table 3 is needed. In the case of a literal, de-mapper 710 passes the value received on signal 732 unmodified to adder 714. For example, a literal value of 65 received by de-mapper 710 is passed directly to adder 714. Adder 714 takes no action or adds 0 as specified by signal 736 thereto resulting in the literal of 65 being output as LLD data 780.

Adder 712 is configured to add the value specified by signal 730 with the number of bits specified by signal 734 provided from de-mapper 710 to extra bits buffer 716. For example, in the case where signal 730 indicated a 3-bit Huffman code, adder 712 adds 3 to the number of extra bits pulled from extra bits buffer 716. The output of adder 712, shown as work buffer shift 782, specifies the amount, e.g., number of bits, to shift the data in work buffer 254 to begin decoding a next Huffman code. The data from work buffer 254 that has been processed is shifted out with an equivalent amount of new data coming in (e.g., at least until the end of the data block or no further data remains to be processed).

It should be appreciated that in the case of distance decoder circuit 264, circuit architecture 700 will operate the same as described. In the case of distance decoder circuit 264, however, only distances are processed (e.g., no literals). Distance decoder circuit 264 will have memories 726 configured to store lookup tables for distance codes. In the case of distance decoder circuit 264, de-mapper 710 will store data such as Table 4 illustrated below.

TABLE 4

| Code | Extra Bits | Distance |
|---|---|---|
| 0 | 0 | 1 |
| 1 | 0 | 2 |
| 2 | 0 | 3 |
| 3 | 0 | 4 |
| 4 | 1 | 5, 6 |
| 5 | 1 | 7, 8 |
| 6 | 2 | 9-12 |

TABLE 4-continued

| Code | Extra Bits | Distance |
|---|---|---|
| 7 | 2 | 13-16 |
| 8 | 3 | 17-24 |
| 9 | 3 | 25-32 |
| 10 | 4 | 33-48 |
| 11 | 4 | 49-64 |
| 12 | 5 | 65-96 |
| 13 | 5 | 97-128 |
| 14 | 6 | 129-192 |
| 15 | 6 | 193-256 |
| 16 | 7 | 257-384 |
| 17 | 7 | 385-512 |
| 18 | 8 | 513-768 |
| 19 | 8 | 769-1024 |
| 20 | 9 | 1025-1536 |
| 21 | 9 | 1537-2048 |
| 22 | 10 | 2049-3072 |
| 23 | 10 | 3073-4096 |
| 24 | 11 | 4097-6144 |
| 25 | 11 | 6145-8192 |
| 26 | 12 | 8193-12288 |
| 27 | 12 | 12289-16384 |
| 28 | 13 | 16385-24576 |
| 29 | 13 | 24577-32768 |

In cases where LL decoder circuit 262 encounters a length, de-mapper 710 is capable of generating a signal (not shown) that may be provided to receiver controller 256. In general, when LL decoder circuit 262 processes a length, receiver controller 256 knows that a distance must follow. Accordingly, in response to LL decoder circuit 262 outputting a length, based on the notification from de-mapper 710 of LL decoder circuit 262, receiver controller 256 causes the next data item to be output from distance decoder circuit 264 so that a complete MLD pair is output.

As noted, circuit architecture 700 is capable of outputting one decoded data item each clock cycle. With two instances of circuit architecture 700 operating cooperatively, e.g., under control of receiver controller 256, Huffman decoder circuit 260 is capable of outputting a LL data item or a distance data item each clock cycle to LZ77 decoder 266.

In one or more embodiments, circuit architecture 700 is implemented using programmable circuitry. For example, circuit architecture 700 may be implemented in programmable logic. In one or more other embodiments, circuit architecture 700 is implemented in hardened circuitry (e.g., circuitry that is fabricated to perform a particular function) such as may be included in an ASIC.

Table 5 below illustrates differences in memories 726 between the LL decoder circuit 262 and the distance decoder circuit 264 implementations of circuit architecture 700.

TABLE 5

| Type of Memory | Memory Width | Memory Depth |
|---|---|---|
| Literal/Length (LL) symbol memory | 9-bit | 1-length to 8-length memory: 2^(Huffman length) 9-length to 15-length memory: 286 |
| Distance symbol memory | 5-bit | 1-length to 4-length memory: 2^(Huffman length) 5-length to 15-length memory: 30 |

As illustrated in Table 5, in the case of the LL decoder circuit 262 implementation, each of the memories 726 is 9-bits in width to accommodate the possible 286 literal/length symbols. As such, each of memories 726 outputs data items of 9 bits (e.g., LL data). Further, memories 726-1 through 726-8 will have a depth in terms of number of entries that is 2 to the power of the Huffman code length for the respective memory (e.g., different depths). Memories 726-9 through 726-15 each will have a depth of 286 entries.

In the case of the distance decoder circuit 264 implementation, each of the memories 726 is 5-bits in width to accommodate the possible 30 distance symbols. As such, each of memories 726 outputs data items of 5 bits (e.g., distance data). Further, memories 726-1 through 726-4 will have a depth in terms of the number of entries that is 2 to the power of the Huffman code length for the respective memory (e.g., different depths). Memories 726-5 through 726-15 each will have a depth of 30 entries.

FIG. 8 illustrates a method 800 of certain operative features of receiver system 252 in accordance with one or more embodiments of the disclosed technology. Accordingly, referring to FIGS. 2, 7, and 8, in block 802, receiver system 252 receives encoded data. The encoded data may be sent as a data stream. In one or more embodiments, 15 bits of encoded data may be loaded into work buffer 254. With reference to method 800, each iteration refers to the processing of encoded data corresponding to one Huffman code, whether such code is for a literal, a length, or a distance.

In block 804, for each of a plurality of iterations, each of processing sections 702 concurrently tests whether the one or more bits of encoded data processed by that processing section are a code or are part of a code. In one or more embodiments, the testing is performed by the comparators 720 with the assertion of a logic high on respective signal(s) provided to control signal decoder 704 indicating that the one or more bits processed by the respective processing section 702 are a code or part of a code.

As discussed, in each iteration, each processing section 702 operates on a different set of the one or more bits of the encoded data and generates a signal specifying a result of the testing that is provided to control signal decoder 704.

In block 806, for each iteration, a selected processing section 702 is capable of generating an address of the memory 726 therein based on the one or more bits of encoded data. For each iteration, the memory 726 of the selected processing section 702 outputs a data item derived from the one or more bits of encoded data processed by the selected processing section 702. Appreciably, the particular processing section 702 that is the "selected processing section" on each iteration may be the same or different depending on the particular encoded data being processed. The particular processing section 702 that is the selected processing section is determined by control signal decoder 704 decoding the indication signals generated by each comparator 720. In block 808, for each iteration, the memory 726 of the selected processing section 702 outputs a data item from the address determined in block 806.

In block 810, the data items for the plurality of iterations are tested to determine whether the data items are literals, lengths, or distances. The testing may be performed on a per data item basis. For example, as discussed, de-mapper 710 is capable of comparing the data item with a lookup table stored therein to determine whether the data item is a literal or a length (e.g., in the case of LL decoder circuit 262). Distance decoder circuit 264 will know whether the data item is a distance based on LL decoder circuit 262 detecting a length.

In block 812, for data items that are literals, the literals are output as LLD data 780. For example, the literals are output unmodified. Adder 714, for example, adds a value of 0 as no bits are read from extra bits buffer 716.

In block 814, for data items that are lengths or distances, the length values or distance values are output and selectively updated based on whether the data item is associated with one or more extra bits and a value of the one or more extra bits. As discussed, for each data item determined to be a length, de-mapper 710 outputs a length value. Any extra bits associated with the length value are provided from extra bits buffer 716 to adder 714 to be added to the length value as output from de-mapper 710. Adder 714 adds the two values to provide a final length value that is output as LLD data 780. For those cases where the length does not have extra bits, the length value as output from de-mapper 710 ends up as LLD data 780 as adder 714 adds the length value to 0.

Similarly, for each data item determined to be a distance, de-mapper 710 outputs a distance value. Any extra bits associated with the distance value are provided from extra bits buffer 716 to adder 714 to be added to the distance value as output from de-mapper 710. Adder 714 adds the two values to provide a final distance value that is output as LLD data 780. For those cases where the distance does not have extra bits, the distance value as output from de-mapper 710 ends up as LLD data 780 as adder 714 as the distance value with 0.

In the actual implementation where a first instance of circuit architecture 700 is used to implement LL decoder circuit 262 and a second instance of circuit architecture 700 is used to implement distance decoder circuit 264, both circuit architectures may operate on same data and operate in a synchronized manner.

As noted, in response to the de-mapper 710 determining that the data item being processed is a length, de-mapper 710 asserts a signal to receiver controller 256 indicating that the date item is a length. In response to that signal, receiver controller 256, by way of a control signal, causes the data output from Huffman decoder circuit 260 in the next clock cycle to be from distance decoder circuit 264 (e.g., a distance value). In one or more example implementations, each instance of circuit architecture 700 may be coupled to a multiplexer or switch that is controlled by receiver controller 256 to output data from the correct instance of circuit architecture 700.

Referring to FIG. 7, both LL decoder circuit 262 and distance decoder circuit 264 may be configured to access the data stored in work buffer 254. As LL decoder circuit 262 decodes LL codes and distance decoder circuit 264 decodes distance codes, the two decoder circuits access encoded data from work buffer 254 at different times. Further, data in work buffer 254 is shifted by work buffer shift 782 from the particular instance of 700 that is generating a valid symbol. For example, a control signal from receiver controller 256 may gate the output of adder 712 for the particular instance of circuit architecture 700 that is not in use so that work buffer 254 is shifted by the correct amount each clock cycle.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores data and/or program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media includes an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "data processing system" means one or more hardware systems configured to process data, each hardware system including at least one hardware processor programmed to initiate operations and memory.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a Graphics Processing Unit (GPU), and a controller.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a controller configured to receive compressed data including data items and qualifier bits for the data items;
   wherein the controller is configured to discard data items designated as invalid by the qualifier bits and generate data type bits specifying data type information for data items designated as valid by the qualifier bits; and
   a buffer;
   wherein the controller is configured to store the data items designated as valid by the qualifier bits and the data type bits in the buffer.

2. The system of claim 1, wherein the data items include a plurality of literals and a plurality of match-length-distance pairs; and
   wherein the controller is configured to store each valid literal and each valid match-length-distance pair within the buffer.

3. The system of claim 1, wherein the compressed data is received as one or more data blocks, wherein each data block includes a plurality of literal slots, one match-length-distance slot, and a plurality of qualifier bits.

4. The system of claim 3, wherein the controller is configured to receive one data block each clock cycle.

5. The system of claim 3, wherein each qualifier bit specifies whether a corresponding literal slot or a corresponding match-length-distance slot stores a valid data item.

6. The system of claim 1, wherein the buffer comprises a data buffer and a data type buffer, wherein the data buffer is configured to store the data items designated as valid, and wherein the data type buffer is configured to store the data type bits.

7. The system of claim 6, wherein:

the data items designated as valid are stored in consecutive memory locations of the data buffer; and the data type bits are stored in consecutive memory locations of the data type buffer.

8. The system of claim 6, wherein the controller, in response to accumulating the data items designated as valid in an amount sufficient to fill a row of the data buffer, writes the amount of the data items designated as valid to the row of the data buffer.

9. The system of claim 6, wherein the controller, in response to accumulating the data type bits in an amount sufficient to fill a row of the data type buffer, writes the amount of the data type bits to the row of the data type buffer.

10. The system of claim 1, further comprising:

an encoder configured to encode the data items designated as valid as read from the buffer based on the data type bits read from the buffer.

11. A system, comprising:

one or more decoders, wherein each decoder includes:

a plurality of processing sections, wherein each processing section processes one or more bits of encoded data from a work buffer and generates a signal specifying whether the one or more bits of encoded data are a code or are part of a code;

a switch configured to pass a data item output from a selected processing section of the plurality of processing sections, wherein the switch selects the selected processing section based on the signal generated by each processing section of the plurality of processing sections;

a de-mapper circuit configured to pass the data item in response to the data item being a literal, or output a length value or a distance value in response to the data item being a length or a distance; and an adder circuit configured to selectively increment the length value or the distance value based on whether the data item has one or more extra bits and a value specified by the one or more extra bits.

12. The system of claim 11, wherein each decoder includes:

a control signal decoder circuit configured to generate a control signal for controlling the switch based on the signal from each processing section of the plurality of processing sections specifying whether the one or more bits of encoded data are the code or part of the code.

13. The system of claim 11, wherein each processing section is configured to process a different number of the one or more bits from the work buffer.

14. The system of claim 13, wherein the one or more bits processed by each processing section that processes two or more bits are consecutive.

15. The system of claim 11, wherein each processing section includes a memory configured to store a lookup table for deriving the data item from the code.

16. The system of claim 15, wherein each processing section includes a comparator configured to compare a unique code offset with the one or more bits processed by the processing section to determine whether the one or more bits processed by the processing section are the code or part of the code.

17. The system of claim 16, wherein the data item is output from the memory of the selected processing section by indexing into the lookup table to an address generated based on a difference between the one or more bits processed by the selected processing section and the unique code offset for the selected processing section.

18. The system of claim 17, wherein each processing section includes a subtraction circuit configured to generate the address.

19. The system of claim 11, wherein:

the plurality of processing sections include N processing sections;

a first of the plurality of processing sections is configured to process one bit of the one or more bits of encoded data from the work buffer; and a last of the plurality of processing sections is configured to process N bits of the one or more bits of encoded data from the work buffer.

20. The system of claim 11, wherein:

the one or more decoders comprise a plurality of decoders;

a first decoder of the plurality of decoders is configured to decode literals and lengths; and a second decoder of the plurality of decoders is configured to decode distances.

* * * * *